US010735153B2

(12) United States Patent
Seo et al.

(10) Patent No.: US 10,735,153 B2
(45) Date of Patent: Aug. 4, 2020

(54) SIGNAL TRANSMISSION OR RECEPTION METHOD AND APPARATUS THEREFOR IN WIRELESS COMMUNICATION SYSTEM

(71) Applicant: LG ELECTRONICS INC., Seoul (KR)

(72) Inventors: Inkwon Seo, Seoul (KR); Hyungtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/301,414

(22) PCT Filed: May 22, 2017

(86) PCT No.: PCT/KR2017/005270
§ 371 (c)(1),
(2) Date: Nov. 13, 2018

(87) PCT Pub. No.: WO2017/204505
PCT Pub. Date: Nov. 30, 2017

(65) Prior Publication Data
US 2019/0296870 A1 Sep. 26, 2019

Related U.S. Application Data

(60) Provisional application No. 62/341,639, filed on May 26, 2016.

(51) Int. Cl.
*H04W 4/00* (2018.01)
*H04L 5/00* (2006.01)
(Continued)

(52) U.S. Cl.
CPC .............. *H04L 5/0037* (2013.01); *H04L 1/00* (2013.01); *H04L 1/1896* (2013.01); *H04L 27/00* (2013.01);
(Continued)

(58) Field of Classification Search
CPC ......... H04L 5/0037; H04L 1/00; H04L 27/00; H04L 1/1896; H04L 2001/0098;
(Continued)

(56) References Cited

U.S. PATENT DOCUMENTS

2006/0171479 A1  8/2006  Tee et al.
2014/0177541 A1  6/2014  Li et al.
(Continued)

FOREIGN PATENT DOCUMENTS

KR  1020100096016   9/2010
WO  2008074919      6/2008

OTHER PUBLICATIONS

LG, "Initial LLS Evaluation Result for NoMA", May 23-27, 2016. (From Applicant's IDS.) (Year: 2016).*
(Continued)

*Primary Examiner* — Mang Hang Yeung
(74) *Attorney, Agent, or Firm* — Lee, Hong, Degerman, Kang & Waimey

(57) ABSTRACT

A method for a base station for transmitting a downlink signal in a wireless communication system according to one embodiment of the present invention comprises the steps of: modulating, of a codeword of a first terminal, a first part by means of a first modulation and coding scheme (MCS) and a second part by means of a second MCS; and transmitting the modulated codeword to the first terminal, wherein the second part of the codeword is transmitted along with a signal of a second terminal from the same resource on the basis of the non-orthogonal multiple access (NOMA) method, and the second MCS for the second part, transmitted on the basis of the NOMA method, has a lower modulation order than the first MCS for the first part.

13 Claims, 11 Drawing Sheets

(51) Int. Cl.
*H04L 1/18* (2006.01)
*H04W 72/04* (2009.01)
*H04L 27/00* (2006.01)
*H04L 1/00* (2006.01)

(52) U.S. Cl.
CPC ....... *H04W 72/042* (2013.01); *H04W 72/048* (2013.01)

(58) Field of Classification Search
CPC ......... H04L 2001/0093; H04L 1/0003; H04W 72/048; H04W 72/042
USPC .......................................................... 370/329
See application file for complete search history.

(56) References Cited

U.S. PATENT DOCUMENTS

2015/0312074 A1* 10/2015 Zhu .................... H04L 27/2627 370/329
2016/0100413 A1 4/2016 Hwang et al.
2016/0183199 A1* 6/2016 Takeda .................. H04W 52/28 370/329
2018/0124684 A1* 5/2018 Kwon ................. H04W 72/044

OTHER PUBLICATIONS

NTT, "Discussion on remaining issues and signaling for DL MUST", May 23- 27, 2016. (From Applicant's IDS.) (Year: 2016).*
PCT International Application No. PCT/KR2017/005270, Written Opinion of the International Searching Authority dated Sep. 19, 2017, 16 pages.
NTT DOCOMO, "Discussion on remaining issues and signaling design for DL MUST", 3GPP TSG RAN WG1 Meeting #85, R1-165205, May 2016, 5 pages.
LG Electronics, "Initial LLS Evaluation Result for NoMA", 3GPP TSG RAN WG1 Meeting #85, R1-164557, May 2016, 8 pages.
European Patent Office Application Serial No. 17803024.3, Search Report dated Oct. 30, 2019, 9 pages.

* cited by examiner

SIGNAL TRANSMISSION OR RECEPTION METHOD AND APPARATUS THEREFOR IN WIRELESS COMMUNICATION SYSTEM

CROSS-REFERENCE TO RELATED APPLICATIONS

This application is the National Stage filing under 35 U.S.C. 371 of International Application No. PCT/KR2017/005270, filed on May 22, 2017, which claims the benefit of U.S. Provisional Application No. 62/341,639, filed on May 26, 2016, the contents of which are all hereby incorporated by reference herein in their entirety.

TECHNICAL FIELD

The present invention relates to a wireless communication system, and more particularly, to a method for transmitting or receiving a signal based on a non-orthogonal multiple access scheme and apparatus therefor.

BACKGROUND ART

Wireless communication systems have been widely deployed to provide various types of communication services such as voice or data. In general, a wireless communication system means a multiple access system that supports communication with multiple users by sharing available system resources (e.g., bandwidth, transmit power, etc.). The multiple access system can be categorized into Orthogonal Multiple Access (OMA) and Non-Orthogonal Multiple Access (NOMA) depending on whether orthogonality is guaranteed.

As examples of the OMA, Frequency Division Multiple Access (FDMA), Time Division Multiple Access (TDMA), Code Division Multiple Access (CDMA), Spatial Domain Multiple Access (SDMA) are included. For each of them, multiple access is performed in the frequency domain, time domain, code domain, and spatial domain.

Meanwhile, if the NOMA, which is a multiple access scheme in the power domain, is interconnected with the OMA, spectral efficiency can be improved.

DISCLOSURE OF THE INVENTION

Technical Task

The object of the present invention is to provide a method for efficiently transmitting or receiving a signal when a NOMA scheme is partially used and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages, in an aspect of the present invention, provided is a method for transmitting a downlink signal by a base station (BS) in a wireless communication system. The method may include: modulating a first part of a codeword for a first User Equipment (UE) based on a first Modulation and Coding Scheme (MCS) and a second part of the codeword based on a second MCS; and transmitting the modulated codeword to the first UE. In this case, the second part of the codeword may be transmitted together with a signal for a second UE on the same resource based on a Non-Orthogonal Multiple Access (NOMA) scheme, and the second MCS for the second part, which is transmitted based on the NOMA scheme, may have a modulation order lower than that of the first MCS for the first part.

In another aspect of the present invention, provided is a base station (BS) for transmitting a downlink signal in a wireless communication system. The BS may include: a processor configured to modulate a first part of a codeword for a first User Equipment (UE) based on a first Modulation and Coding Scheme (MCS) and a second part of the codeword based on a second MCS; and a transmitter configured to transmit the modulated codeword to the first UE under control of the processor. In this case, the second part of the codeword may be transmitted together with a signal for a second UE on the same resource based on a Non-Orthogonal Multiple Access (NOMA) scheme, and the second MCS for the second part which is transmitted based on the NOMA scheme, may have a modulation order lower than that of the first MCS for the first part.

In still another aspect of the present invention, provided is a method for receiving a downlink signal by a first User Equipment (UE) in a wireless communication system. The method may include: receiving a modulated codeword from a base station (BS); and demodulating a first part of the codeword based on a first Modulation and Coding Scheme (MCS) and a second part of the codeword based on a second MCS. In this case, the second part of the codeword may be received together with a signal for a second UE on the same resource based on a Non-Orthogonal Multiple Access (NOMA) scheme, and the second MCS for the second part, which is received based on the NOMA scheme, may have a modulation order lower than that of the first MCS for the first part.

The first part and the second part may be mapped to different Physical Resource Block (PRB) pairs or layers.

The transmission based on the NOMA scheme may be performed in a unit of a PRB pair or in a unit of a layer.

The BS may transmit, to the first UE, downlink control information indicating a first resource on which the transmission based on the NOMA scheme is not performed, a second resource on which the transmission based on the NOMA scheme is performed, and the first MCS applied to the first resource.

The second MCS may be indicated by the downlink control information or detected by the first UE through blind detection.

The BS may determine the first part to which the first MCS is to be applied and the second part to which the second MCS is to be applied by considering a location of a resource to which each part of the codeword to be mapped after the modulation.

The first part and the second part may correspond to one codeword transmitted in one subframe.

The first UE may obtain the second part of the codeword by cancelling the signal for the second UE using a received power difference.

In a further aspect of the present invention, provided is a User Equipment (UE) for performing the above-described method for receiving a downlink signal.

Advantageous Effects

According to an embodiment of the present invention, a NOMA scheme can be applied to at least part of transmitted and received signals, whereby UE paring can be smoothly performed. In addition, different modulation orders can be used for one codeword, thereby preventing performance from being degraded at the part where the NOMA scheme is applied.

It will be appreciated that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
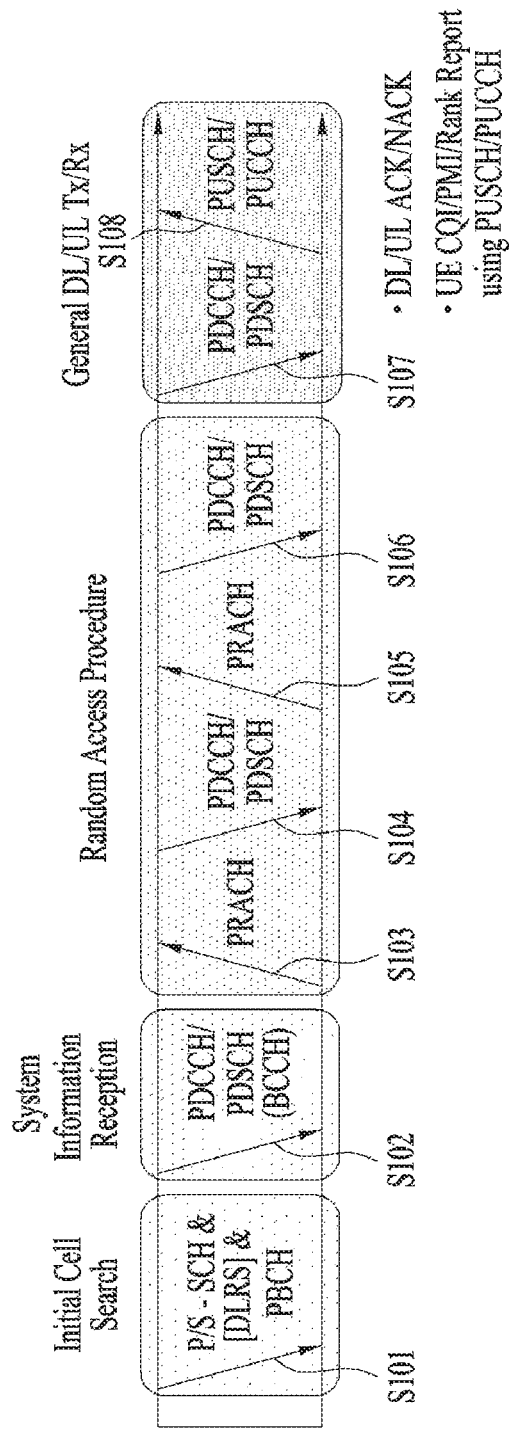
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/

NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
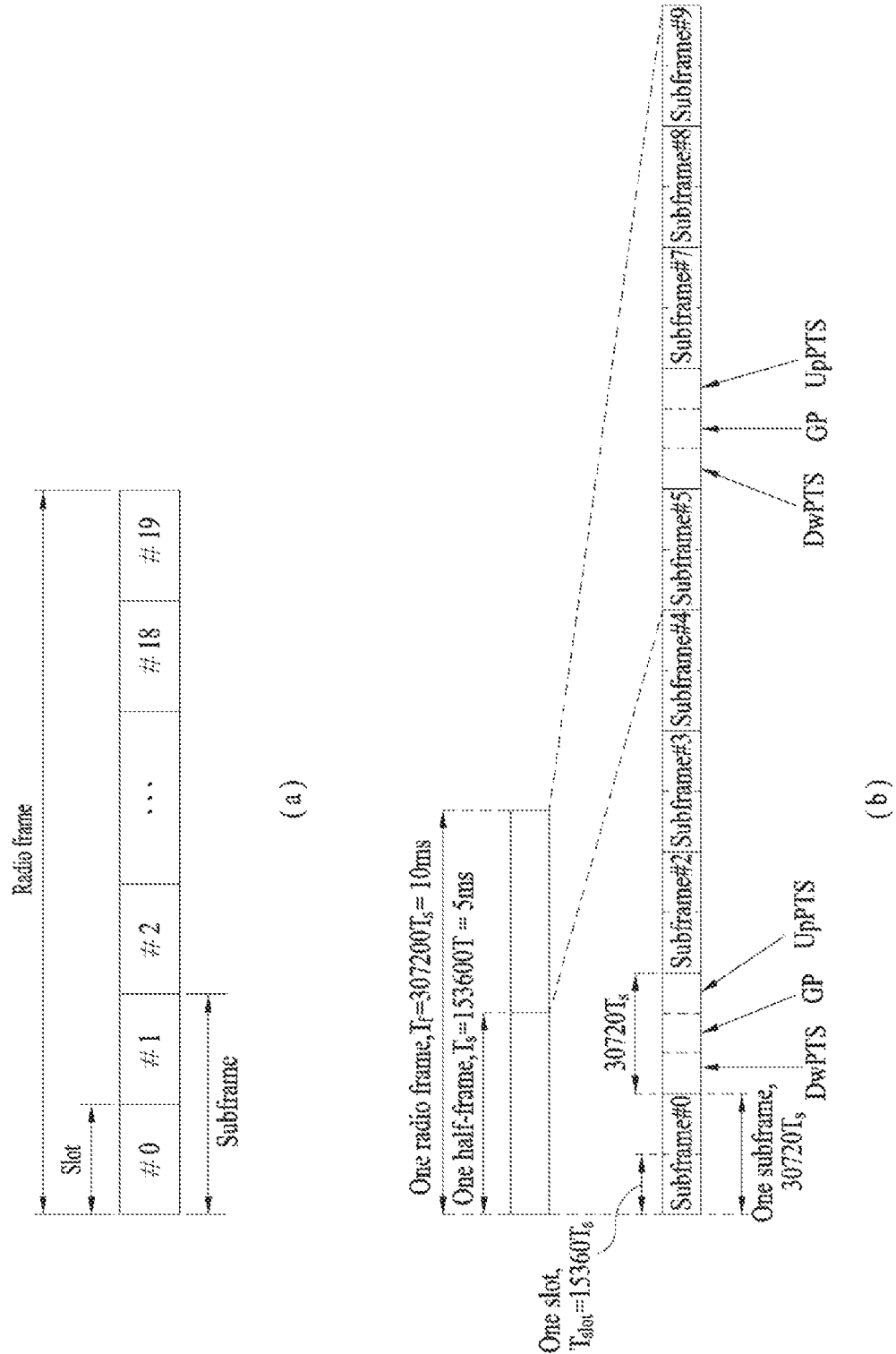
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
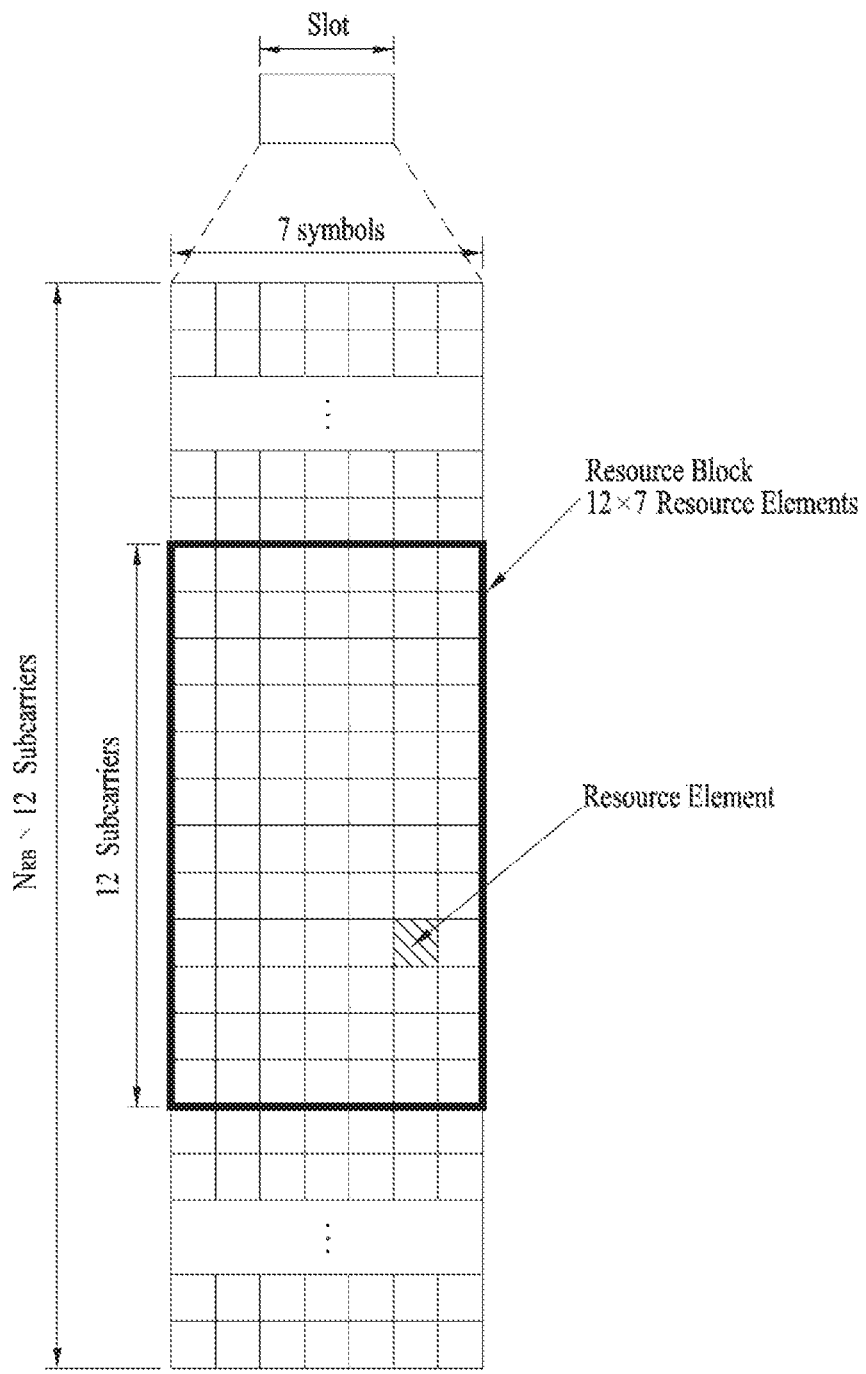
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
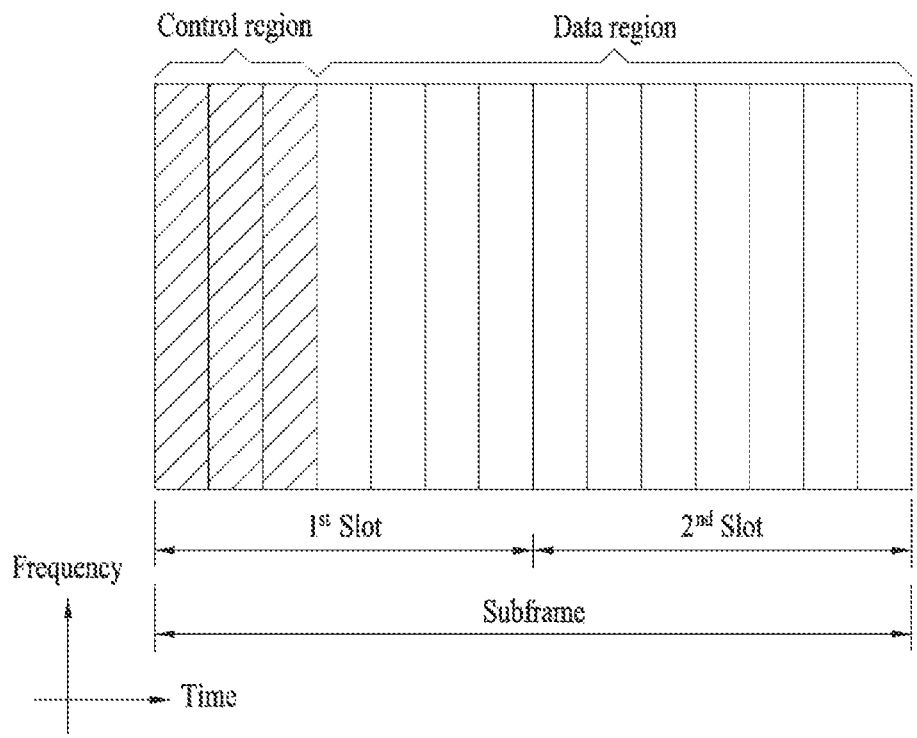
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE(-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
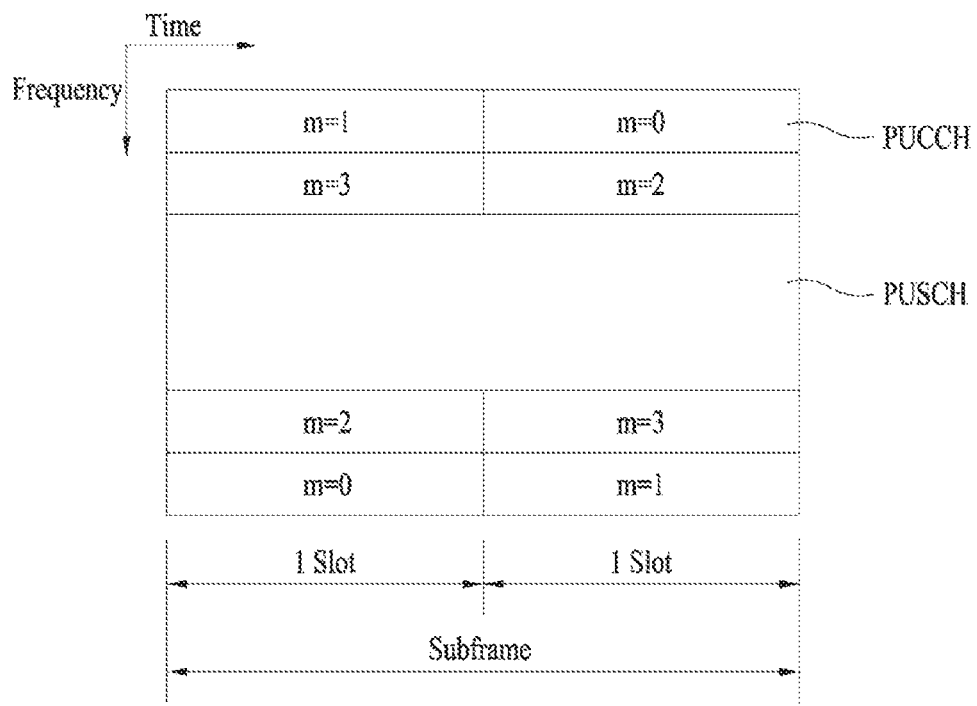
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/or CSI (Channel State Information)s.

New RAT

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
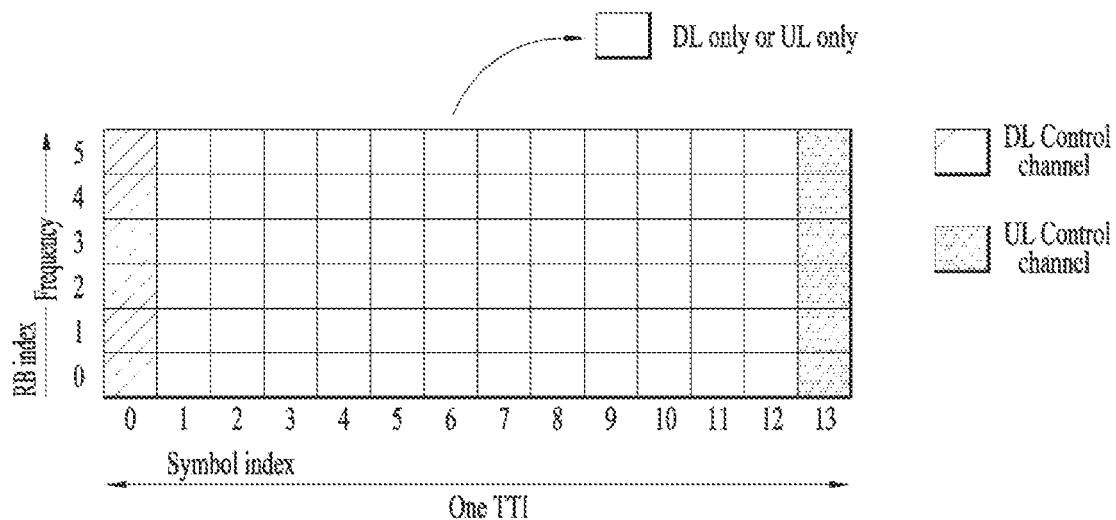
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
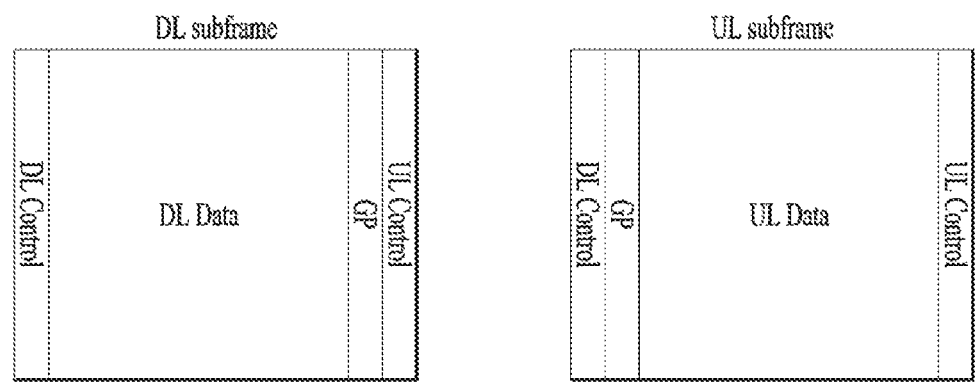
FIG. 7 is a diagram illustrating a downlink self-contained subframe and an uplink self-contained subframe according to one embodiment of the present invention.

FIG. 7 illustrates DL and UL subframes according to an embodiment of the present invention.

Referring to FIG. 7, a GP is located at a point where DL to UL switching occurs. For example, in a DL subframe, the GP is located between a DL data region and a UL control region, and in a UL subframe, the GP is located between a DL control region and a UL data region.

The GP may include Tx/Rx switching time of an eNB/UE and a Timing Advance (TA) for UE's UL transmission.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

Modulation Order for NOMA Operation

Hereinafter, Non-Orthogonal Multiple Access (NOMA) operation, which can be applied to the LTE/LTE-A system or 5G system (e.g., new RAT), will be described on the basis of the above discussion.

In 3GPP TR 35.859, DL Multiuser Superposition Transmission (MUST) for LTE has been introduced. The NOMA can be used for LTE(-A) DL MUST.

In addition, various DL/UL multiple access schemes have been discussed for the new RAT. Among these schemes, the NOMA scheme in the code or power domain has been considered as a main issue. For example, Multi-User Shared Access (MUSA), Sparse Code Multiple Access (SCMA), Non-orthogonal coded multiple access (NCMA), and the like have been discussed.

For example, UL NOMA means a scheme of allocating the same UL resource to a plurality of UEs and performing multi-access in the power domain by adjusting transmit power of each UE.

Figure 8:
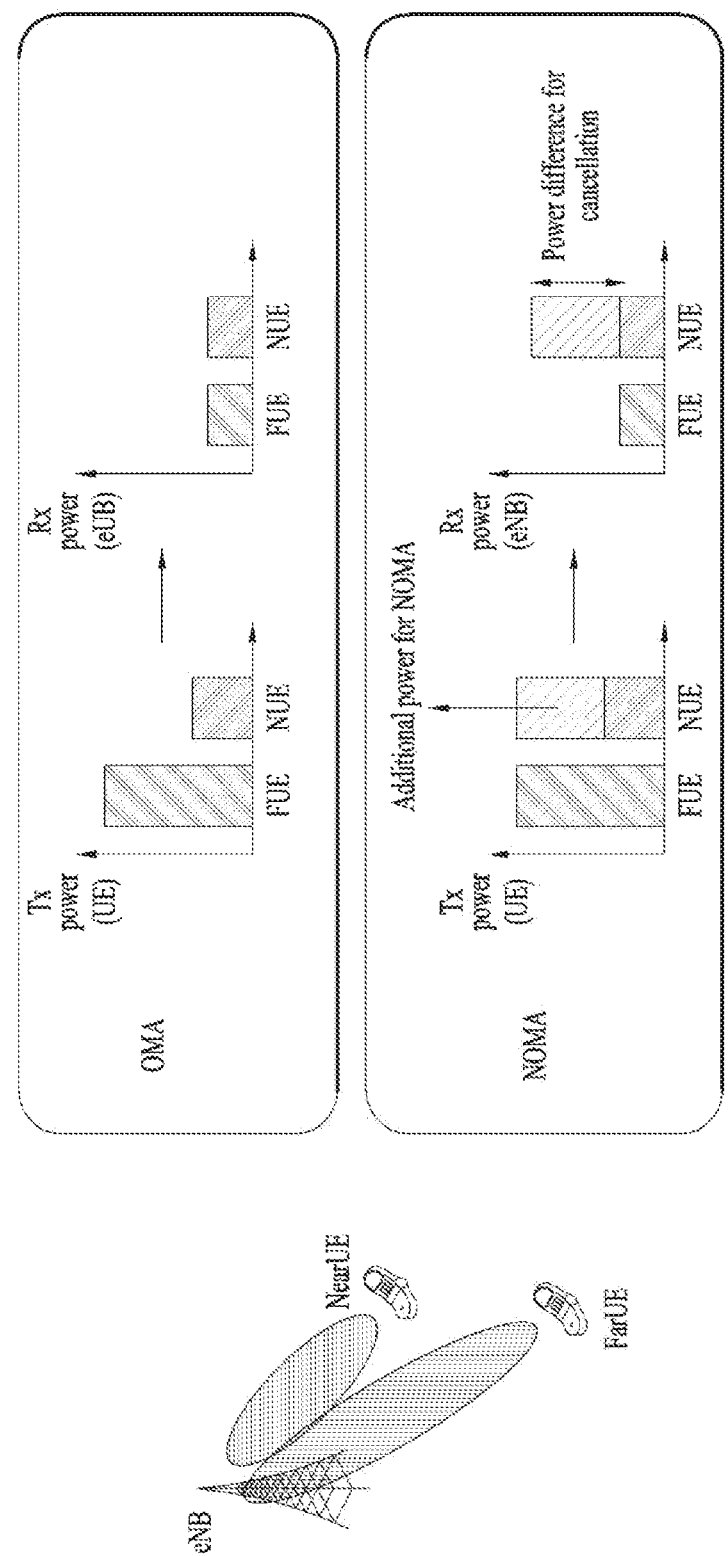
FIG. 8 illustrates UL NOMA according to an embodiment of the present invention.

FIG. 8 illustrates UL NOMA according to an embodiment of the present invention.

In FIG. 8, OMA may means the conventional LTE uplink transmission. According to the OMA, an eNB may allocate different transmit power to each UE by considering an appropriate SINR that satisfies the reception requirements of the eNB. In this case, the resources used by individual UEs are orthogonal to each other.

If the NOMA is adopted as an uplink multiple access scheme, the eNB performs decoding using difference between received power from the perspective of the eNB unlike the OMA. For example, the eNB receives total signals where at least part of a signal transmitted from a Far UE (FUE) and a signal transmitted from a Near UE (NUE) are superposed on the same resource. Since the difference between the signal transmitted from the FUE and the signal transmitted from the NUE is significant, the two signals can be distinguished in the power domain. The eNB first decodes the signal from the NUE (NUE signal), which has higher received power. Thereafter, after canceling the decoded NUE signal from the total signals, the eNB decodes the signal from the FUE (FUE signal), which has lower received power, from the remaining signal.

Figure 9:
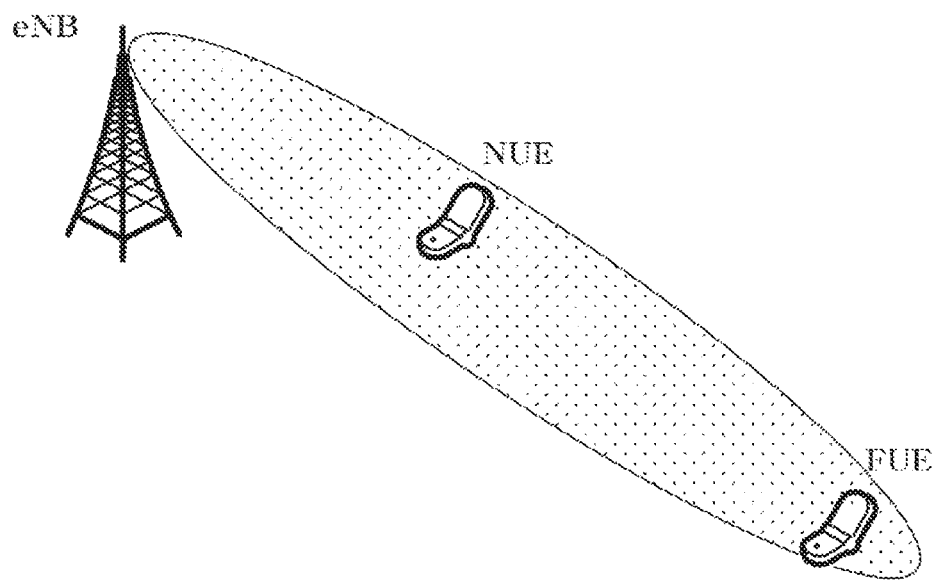
FIG. 9 illustrates DL NOMA according to an embodiment of the present invention.

FIG. 9 illustrates DL NOMA according to an embodiment of the present invention.

In a NOMA environment, UEs allocated different transmit power can be set as a NOMA pair. Although FIG. 9 depicts that two UEs are set as a single NOMA pair, this is only for convenience of description and the invention can be applied when two or more UEs are set as a single NOMA pair or NOMA group.

An eNB can configure different DL transmit (Tx) power for UEs belonging to a NOMA pair, superpose modulation symbols for the UEs, and then transmit a NOMA signal. For example, relatively low power is configured for a NUE, and relatively high power is configured for a FUE. Thus, regarding the total transmit power for the NOMA signal, the transmit power allocated for the NUE is higher than that allocated for the NUE.

Such a power-domain superposition scheme can be referred to the NOMA operation. According to the NOMA operation, an eNB pairs UEs whose SINR difference equal to or more than a predetermined level, superposes signals for the paired UEs, and then transmits a NOMA signal. In this case, a NUE, which is allocated lower power, applies a reduced Maximum Likelihood (ML) algorithm to the NOMA signal by cancelling a signal for a FUE, which is allocated higher power, from the received NOMA signal or considering the FUE signal.

The NOMA operation can improve throughput, and in this case, as the number of superposed UEs, that is, the number of paired UEs increase, the system throughput can be further improved. For example, a method of pairing UEs allocated different bandwidth or a method of applying superposition (e.g., NOMA operation) only to a specific layer can be considered in order to increase the number of paired UEs or UE paring probability.

In the following description, problems that may occur when the UE pairing probability increases and methods for solving the problems will be explained. Although the present invention is described based on a NUE in DL NOMA for convenience of description, the invention is not limited thereto and can be applied to not only a FUE in DL NOMA but UL NOMA.

Issue 1: Interference Difference Between RBs

To improve the pairing probability, it is desirable that even if UEs use different amounts of resources, a network pairs the UEs. In this case, from the perspective of a NUE, interference difference may significantly increase depending on the resources within allocated bandwidth.

For example, it is assumed that a NUE performing DL reception on allocated bandwidth composed of 12 RBs is paired with a FUE performing DL reception on allocated bandwidth composed of 5 RBs. In this case, one NUE may be paired with multiple FUEs on the same resources, or it may be paired with a different FUE per resource. A FUE signal causes strong interference to 5 RBs among the NUE's reception resources and normal interference to the remaining 7 RBs. In this case, even though the FUE signal is cancelled, performance degradation may occur in the region corresponding to the 5 RBs due to residual interference or the like. Thus, for more efficient DL transmission, the UE and an eNB need to operate by considering the inference having large deviation on the allocated resources.

Issue 2: Interference Difference Between Layers in 1 Codeword & Multi-Layer Transmission In the current LTE, one codeword can be transmitted through multiple layers only in a specific case. For example, when two codewords are transmitted at ranks 3 and 4, one codeword may be transmitted through two layers. As another example, when codeword retransmission is performed due to NACK, the corresponding codeword retransmission may be performed using two layers.

If one codeword is transmitted through multiple layers and the NOMA operation is applied only to some of the multiple layers, the amount of interference added to the codeword may vary per layer. According to the current LTE standards, only one Modulation and Coding Scheme (MCS) can be applied to one codeword. However, for more efficient DL transmission, a UE and eNB need to operate by considering the inference having large deviation per layer.

Hereinafter, the methods for solving the above-mentioned problems will be described.

According to an embodiment of the present invention, a different modulation order can be configured per PRB pair or PRB pair group. For example, although one Transport Block (TB) size is configured for a specific codeword (or a specific TB), different modulation orders may be defined per PRB pair or PRB pair group on resources for transmitting the corresponding codeword. For example, assuming that resource allocated for transmitting one codeword include first and second PRB pairs, a first MCS may be applied to the first PRB pair and a second MCS may be applied to the second PRB pair.

By configuration low modulation orders for resources where interference is high, an eNB can perform modulation such that the system becomes more robust to interference. For example, if a NUE performs DL reception on 20 PRB pairs, QPSK may be applied to 10 PRB pairs where interference caused by a FUE signal is present among the 20 PRB pairs, and 16 QAM may be applied to the remaining 10 PRB pairs where there is no interference from a FUE. Alternatively, resources assigned for a NUE may include a resource for receiving a NUE signal only and multiple resources paired with different FUEs.

To this end, a network may signal the modulation order configuration of each resource, or a NUE may perform blind detection to detect the modulation order configured for each resource.

As a simple method, the eNB may signal PRB pairs to which the NOMA operation is applied and the modulation orders of the corresponding PRB pairs (e.g., NOMA MCS) through DCI. At this time, the basic MCS can be signaled together or separately. The basic MCS may be applied to PRB pairs to which the NOMA operation is not applied, and the NOMA MCS may be applied to the PRB pairs to which the NOMA operation is applied. The modulation order of the NOMA MCS may be lower than that of the basic MCS. In this case, there are a plurality of PRB pairs or PRB pair groups, where the NOMA operation is applied. In addition, the TB size signaled through the basic MCS may be applied. That is, if the index of the basic MCS indicates a combination of a modulation order, a TBS index (i.e., TB size), and a Redundancy Version (RV), the TB size indicated by the index of the basic MCS can be applied to not only the PRB pairs where the NOMA operation is not applied but the PRB pairs where the NOMA operation is applied. That is, for one TB size, the modulation order may vary per PRB pair (or PRB pair group).

As another method, a UE may perform blind detection to estimate the modulation orders of PRB pairs to which the NOMA operation is applied. For example, the network configures the MCS of a corresponding subframe (e.g., basic MCS) through DCI, and the UE may grasp the resources to which the NOMA operation is applied from signaling or by performing the blind detection. Thereafter, the UE may also grasp the modulation orders of the NOMA resources through the blind detection. In this case, to reduce the complexity of the blind detection, the UE may perform the blind detection with respect to only modulation orders equal to or less than the modulation order indicated by the basic MCS. That is, a NOMA MCS may be predefined to have a modulation order equal to or less than that of the basic MCS. Similar to the aforementioned method, only one TB size is configured, but different modulation orders can be configured within allocated bandwidth. In addition, the UE can perform the blind detection to grasp each modulation order.

Meanwhile, the above-described modulation order configuration method can be applied to ISSUE 2. For example, when one TB is transmitted through multiple layers, a different modulation order may be applied to each layer. A UE may know, from signaling or blind detection, that for the same TB, a different modulation order is applied to each layer. The network may indicate layers to which the NOMA operation is applied, and the modulation order indicated by an MCS field (e.g., basic MCS) may not be applied to the corresponding layers. Alternatively, the UE may know the layers to which the NOMA operation is applied and the modulation orders of the corresponding layers through blind detection.

In addition, ISSUE 1 and ISSUE 2 can be combined with each other. For example, a NUE signal may be transmitted only through a first layer among multiple layers allocated for a NUE, and a second layer may contain at least one of a resource dedicated to a NUE signal, a resource paired with FUE1, and a resource paired with FUE2. In this case, a modulation order may be separately configured for each of the resource(s) paired with the FUEs. The network may signal the configured modulation orders, or the UE may perform blind detection of the modulation orders.

Moreover, it is defined in the current LTE that frequency-first resource mapping is applied to physical shared channels such as a PDSCH, PUSCH, etc. That is, a UE can assume that regarding allocated DL resources, modulated symbols are first mapped in the frequency domain. For UL, a UE maps modulated symbols preferentially in the frequency domain.

According to the above proposals, the NOMA scheme can be applied to at least part of allocated bandwidth (BW), and a low modulation order can be configured in a region to which the NOMA is applied.

Therefore, it is necessary to distinguish between bit periods where individual modulation orders are applied while coded bits are converted into a modulated symbol. That is, even if all the coded bits belong to the same TB, some of the coded bits may be modulated based on a first modulation order, and some of the coded bits may be modulated based on a second modulation order. Regarding the coded bits, which modulation order will be applied to which bit period may be determined according to which PRB pair the corresponding modulated symbol will be mapped or which layer the corresponding modulated symbol will be transmitted through. This is because a different modulation order (e.g., MCS) can be applied per PRB pair or layer. Hence, an eNB (or a UE in UL) should determine a resource (e.g., PRB pair) or layer to which coded bits, which consist of a modulation symbol, will be mapped before creating the modulation symbol (i.e., before modulation). Thereafter, the eNB modulates the bits (e.g., channel-coded bits) using a modulation order corresponding to the resource or layer determined for the purpose of mapping. Then, the eNB maps the modulated symbol generated by the modulation process to the previously determined resource (e.g., PRB pair) or layer.

Figure 10:
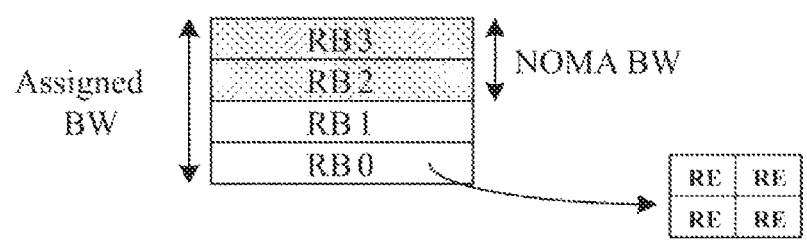
FIG. 10 to FIG. 12 illustrate modulation schemes according to embodiments of the present invention.
Figure 10:
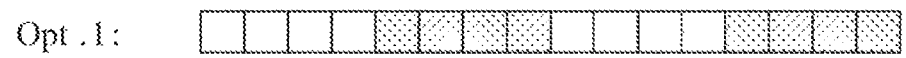
Figure 10:
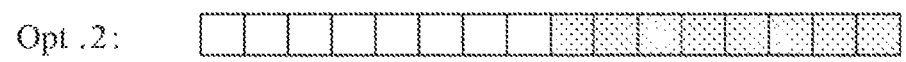

For the above-described eNB and/or UE operation, it is possible to consider the modulation options shown in FIG. 10.

For clarity of description, it is assumed in FIG. 10 that one RB is composed a total of four REs, and more specifically, one RB includes two symbols in the time domain and two subcarriers in the frequency domain. In addition, it is also assumed that in RB 0 and RB 1, the NOMA operation is not performed and the 16 QAM modulation scheme is applied, and in RB 2 and RB 3, the NOMA operation is performed and the QPSK modulation scheme is applied.

It could be interpreted to mean that option 1 is for frequency-first resource mapping and option 2 is for time-first resource mapping. In option 2, the time-first mapping may be applied at least to subframes where the NOMA is applied, and either the time-first mapping or frequency-first mapping may be applied to a region where the NOMA is not applied.

Here, 16 blocks corresponding to option 1 and 16 blocks corresponding to option 2 could be interpreted as the sequence of a complex symbol (e.g., modulated symbol) to be mapped to a corresponding layer. For example, option 1/2 could be interpreted as a method by which 16 complex symbols are mapped to 16 REs included in RB 0 to RB 3.

Moreover, a network may signal to a UE which one of option 1 and option 2 will be used. Alternatively, it may be defined in advance.

Although the QPSK and 16 QAM schemes are assumed for convenience of description, the present invention is not limited thereto and various modulation schemes such as BPSK, 64 QAM, 128 QAM and 256 QAM can also be used.

Figure 11:

FIG. 11 is a diagram for explaining in detail the modulation and mapping schemes in accordance with option 1 of FIG. 10. In FIG. 10, the assumptions of FIG. 10 are equally applied.

Referring to FIG. 11, b(i) indicates the $i^{th}$ coded bit, and d(n) indicates the $n^{th}$ complex symbol. It is assumed that 1 TB is composed of 48 coded bits. 48 coded bits are modulated by the 16 QAM or QPSK scheme so that 16 complex symbols are created. Specifically, coded bits b(0) to b(3) are modulated by the 16 QAM scheme so that complex symbol d(0) is created, and coded bits b(16) and b(17) are modulated by the QPSK scheme so that complex symbol d(4) is created.

In addition, b(0) to b(15) are modulated by the 16 QAM scheme, and then b(16) to b(23) are modulated by the QPSK scheme. Further, b(24) to b(39) are modulated by the 16 QAM scheme, and b(40) to b(47) are modulated by the QPSK scheme.

Which modulation scheme is used to modulate individual bits is determined by considering which resource a created complex symbol will be mapped to. In other words, since if the frequency-first mapping is used, d(0) to d(3) are mapped to RB 0 and RB 1 where no NOMA operation is applied, the QAM scheme is used. Thus, an eNB (or a UE in UL) uses the 16 QAM scheme to modulate b(0) to b(15) until it generates first 4 complex symbols. In addition, since d(4) to d(7) are mapped to RB 2 and RB 3 where the NOMA operation is applied, the QPSK scheme is used. As described above, the eNB selects a modulation scheme by considering the location of a resource to which each modulated bit will be mapped.

Figure 12:
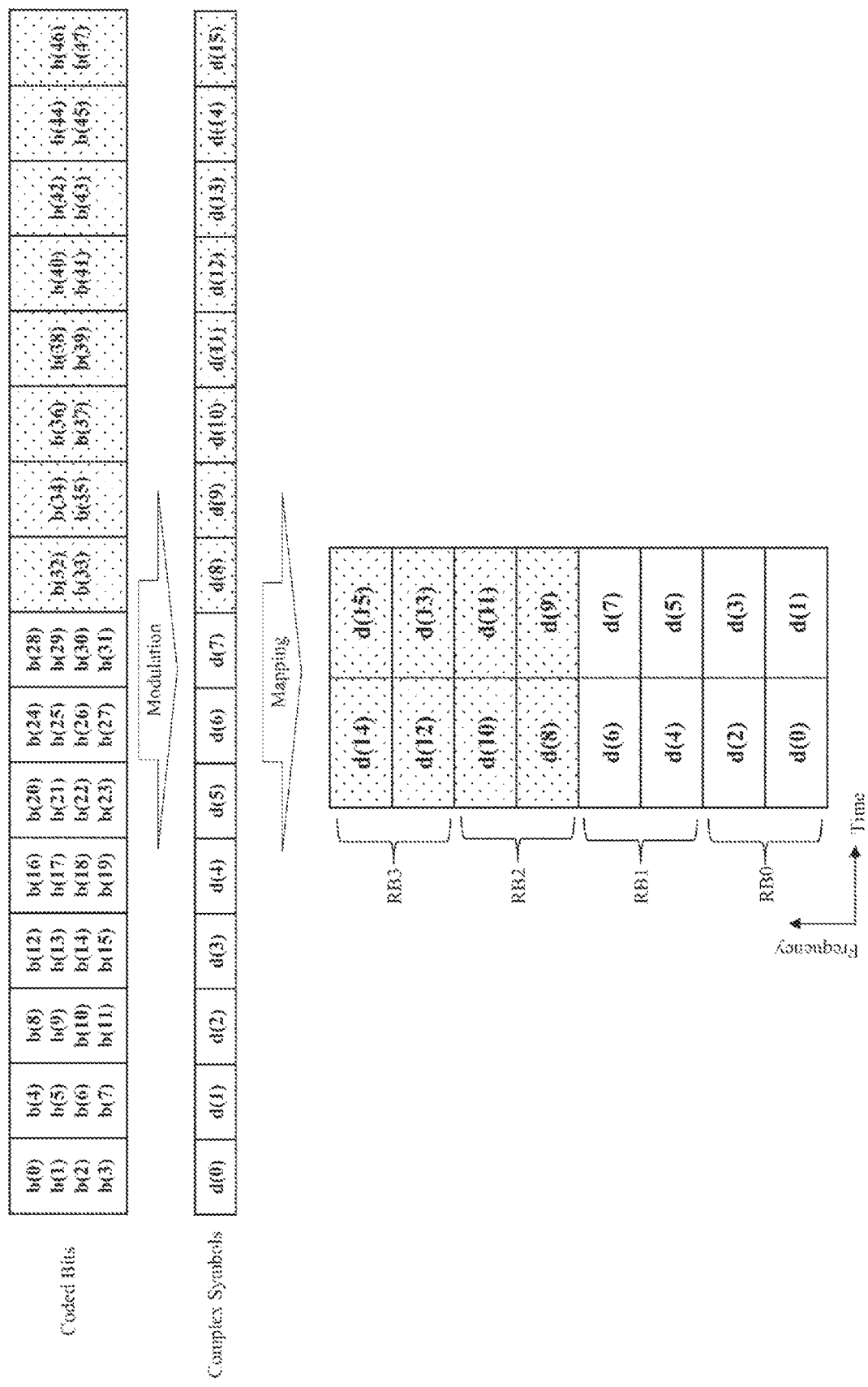

FIG. 11 is a diagram for explaining in detail the modulation and mapping schemes in accordance with option 2 of FIG. 10. In FIG. 12, the assumptions of FIG. 10 are equally applied, and the details already mentioned in FIG. 11 will not be described again.

In FIG. 12, the time-first mapping scheme is used unlike FIG. 11. In FIG. 12, d(0) to d(7) are mapped to RB 0 and RB 1 where no NOMA operation is applied, and d(8) to d(15) are mapped to RB 2 and RB 3 where the NOMA operation is applied.

Thus, b(0) to b(31) are modulated by the 16 QAM scheme, and then b(32) to b(47) are modulated by the QPSK scheme.

Although the above examples mainly assume the DL NOMA, the present invention is not limited thereto and can be applied the UL NOMA as well. In the case of the DL NOMA, as long as an eNB signals to a UE a resource region to which the NOMA is applied, the UE can perform demodulation based on the modulation order of each resource region. On the other hand, in the case of the UL NOMA, if a network signals to a UE information on a region where the NOMA is applied (e.g., UL grant), the UE can perform UL transmission by applying different modulation orders to one symbol sequence (e.g., coded bits corresponding to 1 TB) based on the information on the corresponding region and resource mapping schemes.

Figure 13:
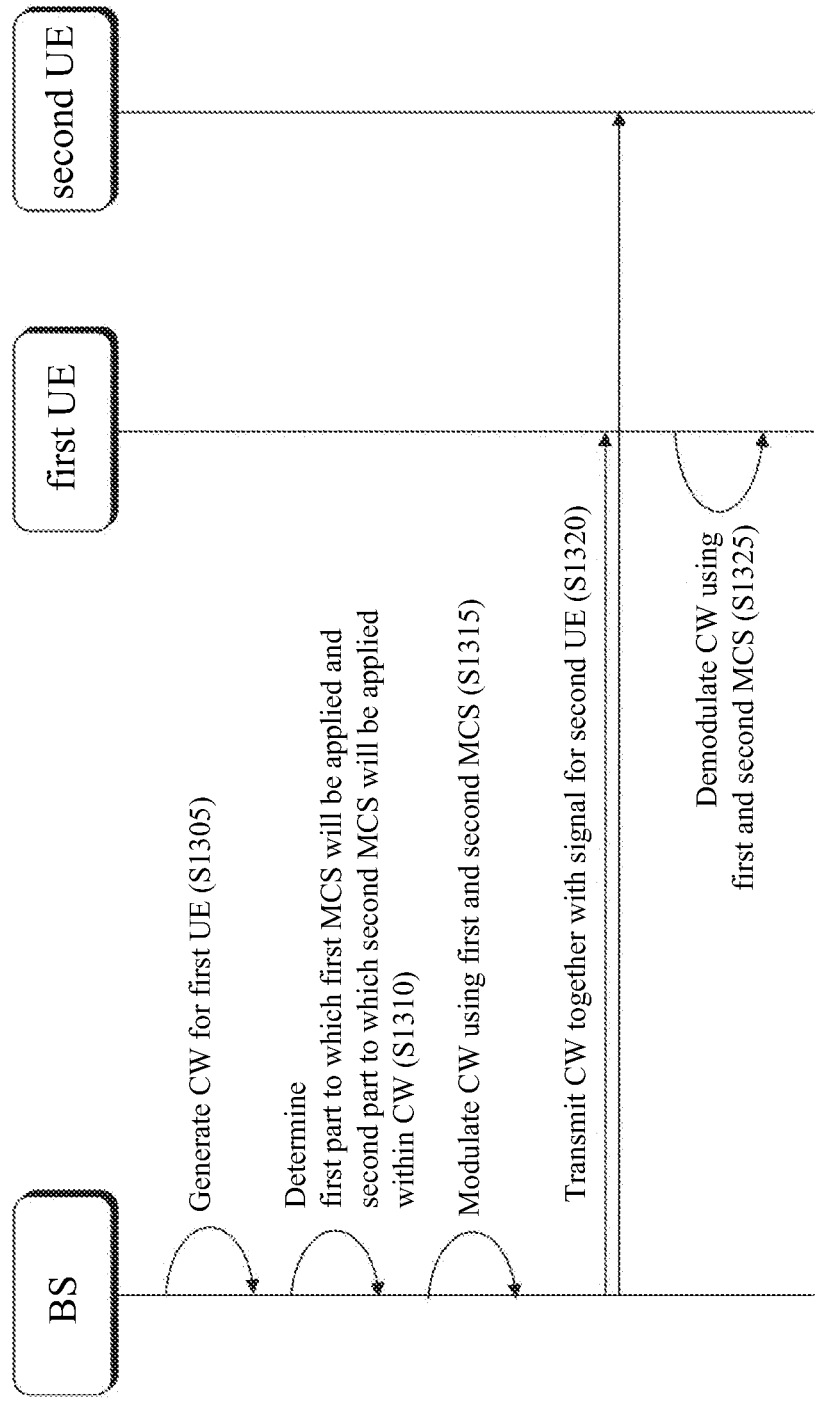
FIG. 13 is a flowchart of a signal transmission and reception method according to an embodiment of the present invention.

FIG. 13 is a flowchart of a signal transmission and reception method according to an embodiment of the present invention. Redundant description will be omitted. For convenience of description, it is assumed that a first UE is a NUE allocated low DL power and a second UE is a FUE allocated high DL power.

Referring to FIG. 13, an eNB generates a codeword for a first UE [S1305]. For example, the eNB generates the codeword for the first UE by performing channel coding on a Transport Block (TB) for the first UE. The codeword includes multiple coded bits. For convenience of description, the term "transport block" can be interchangeably used with the term "codeword".

The eNB determines a first part to which a first MCS will be applied and a second part to which a second MCS will be applied within the generated codeword for the first UE [S1310]. The eNB may determine the first part to which the first MCS is to be applied and the second part to which the second MCS is to be applied by considering resource locations to which the individual parts of the codeword are to be mapped after the modulation.

The eNB modulates the first part of the first UE's codeword using the first MCS and the second part of the first UE's codeword using the second MCS [S1315].

The eNB transmits the modulated codeword to the first UE [S1320]. In this case, the second part of the codeword may be transmitted together with a signal for a second UE on the same resource based on a NOMA scheme. The second MCS for the second part transmitted based on the NOMA scheme may have a modulation order lower than that of the first MCS for the first part.

The first part and the second part may be mapped to different PRB pairs or layers. The transmission based on the NOMA scheme may be performed per PRB pair or layer.

The eNB may transmit, to the first UE, DCI indicating a first resource on which the transmission based on the NOMA scheme is not performed, a second resource on which the transmission based on the NOMA scheme is performed, and the first MCS applied to the first resource. The DCI may be transmitted in the same subframe as the modulated codeword. The second MCS may be indicated by the DCI or detected by the first UE through blind detection.

The first part and the second part may correspond to one codeword transmitted in one subframe.

The first UE may obtain the second part of the codeword by cancelling the signal of the second UE using a received power difference.

Figure 14:
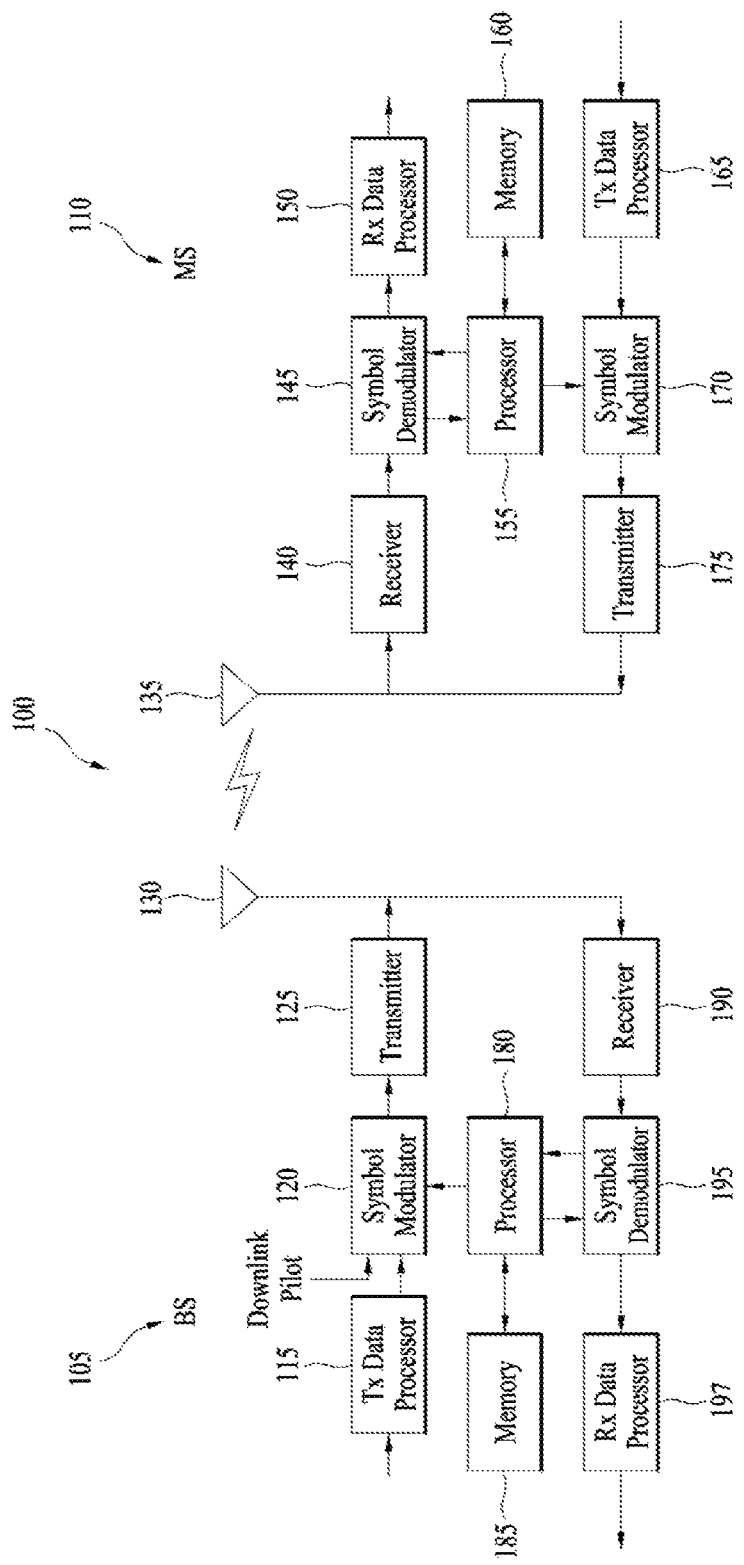
FIG. 14 illustrates an eNB and a UE according to an embodiment of the present invention.

FIG. 14 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 14, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method for transmitting a downlink signal by a base station (BS) in a wireless communication system, the method comprising:
   modulating a first part of a codeword for a first User Equipment (UE) based on a first Modulation and Coding Scheme (MCS) and a second part of the codeword based on a second MCS;
   transmitting, to the first UE, the modulated codeword and downlink control information indicating a first resource on which the transmission based on a Non-Orthogonal Multiple Access (NOMA) scheme is not performed, a second resource on which the transmission based on the NOMA scheme is performed, and the first MCS applied to the first resource,
   wherein the second part of the codeword is transmitted together with a signal for a second UE on a same resource based on the NOMA scheme, and
   wherein the second MCS for the second part which is transmitted based on the NOMA scheme, has a modulation order lower than that of the first MCS for the first part.

2. The method of claim 1, wherein the first part and the second part are mapped to different Physical Resource Block (PRB) pairs or different layers.

3. The method of claim 2, wherein the transmission based on the NOMA scheme is performed in a unit of a PRB pair or in a unit of a layer.

4. The method of claim 1, wherein the second MCS is indicated by the downlink control information or detected by the first UE through blind detection.

5. The method of claim 1, further comprising:
   determining the first part to which the first MCS is to be applied and the second part to which the second MCS is to be applied by considering a location of a resource to which each part of the codeword to be mapped after the modulation.

6. The method of claim 1, wherein the first part and the second part correspond to one codeword transmitted in one subframe.

7. A base station (BS) for transmitting a downlink signal in a wireless communication system, the BS comprising:
   a processor configured to modulate a first part of a codeword for a first User Equipment (UE) based on a first Modulation and Coding Scheme (MCS) and a second part of the codeword based on a second MCS; and
   a transmitter configured to transmit, to the first UE, the modulated codeword and downlink control information indicating a first resource on which the transmission based on a Non-Orthogonal Multiple Access (NOMA) scheme is not performed, a second resource on which the transmission based on the NOMA scheme is performed, and the first MCS applied to the first resource,
   wherein the second part of the codeword is transmitted together with a signal for a second UE on a same resource based on the NOMA scheme, and
   wherein the second MCS for the second part, which is transmitted based on the NOMA scheme, has a modulation order lower than that of the first MCS for the first part.

8. A method for receiving a downlink signal by a first User Equipment (UE) in a wireless communication system, the method comprising:
   receiving, from a base station (BS), a modulated codeword and downlink control information indicating a first resource on which the reception based on a Non-Orthogonal Multiple Access (NOMA) scheme is not performed, a second resource on which the reception based on the NOMA scheme is performed, and the first MCS applied to the first resource; and
   demodulating a first part of the codeword based on a first Modulation and Coding Scheme (MCS) and a second part of the codeword based on a second MCS,
   wherein the second part of the codeword is received together with a signal for a second UE on a same resource based on the NOMA scheme, and
   wherein the second MCS for the second part which is received based on the NOMA scheme, has a modulation order lower than that of the first MCS for the first part.

9. The method of claim 8, wherein the first part and the second part are mapped to different Physical Resource Block (PRB) pairs or different layers.

10. The method of claim 9, wherein the reception based on the NOMA scheme is performed in a unit of a PRB pair or in a unit of a layer.

11. The method of claim 8, wherein the second MCS is indicated by the downlink control information or detected by the first UE through blind detection.

12. The method of claim 8, wherein the first UE obtains the second part of the codeword by cancelling the signal for the second UE based on a received power difference.

13. A User Equipment (UE) for receiving a downlink signal in a wireless communication system, the UE comprising:
   a receiver; and
   a processor configured to:
   control the receiver to receive, from a base station (BS), a modulated codeword and downlink control information indicating a first resource on which the reception based on a Non-Orthogonal Multiple Access (NOMA) scheme is not performed, a second resource on which the reception based on the NOMA scheme is performed, and the first MCS applied to the first resource; and
   demodulate a first part of the codeword based on a first Modulation and Coding Scheme (MCS) and a second part of the codeword based on a second MCS,
   wherein the second part of the codeword is received together with a signal for another UE on a same resource based on the NOMA scheme, and
   wherein the second MCS for the second part which is received based on the NOMA scheme, has a modulation order lower than that of the first MCS for the first part.

* * * * *